W. AHRENS.
ANTIFRICTION BEARING.
APPLICATION FILED AUG. 27, 1909.
1,151,847.
Patented Aug. 31, 1915.
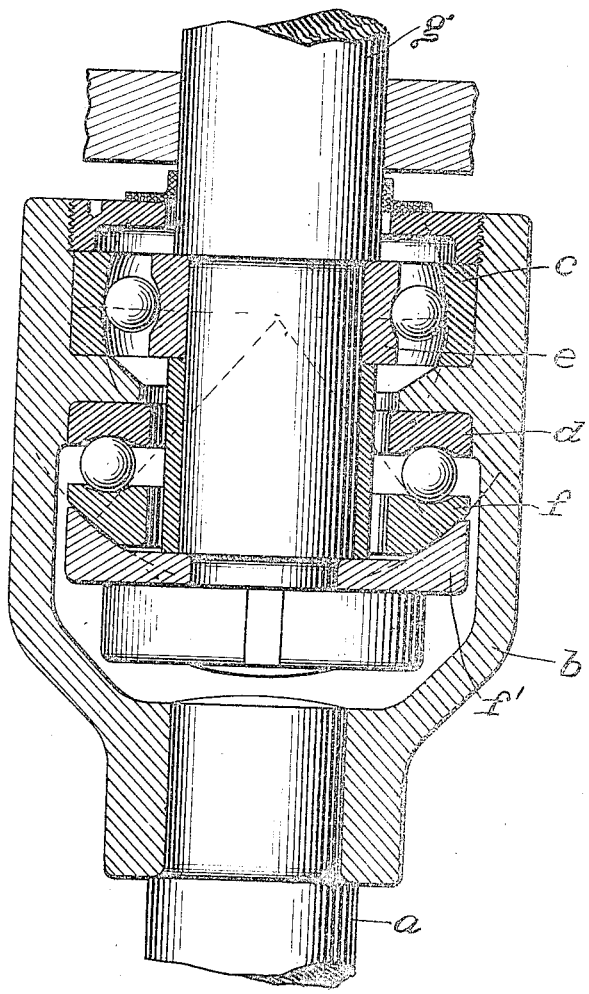

UNITED STATES PATENT OFFICE.

WERNER AHRENS, OF TEGEL, GERMANY.

ANTIFRICTION-BEARING.

1,151,847. Specification of Letters Patent. Patented Aug. 31, 1915.

Application filed August 27, 1909. Serial No. 514,893.

*To all whom it may concern:*

Be it known that I, WERNER AHRENS, a subject of the Emperor of Germany, residing at Tegel, Germany, have invented certain new and useful Improvements in Antifriction-Bearings, of which the following is a specification, reference being had therein to the accompanying drawing.

This invention relates to anti-friction bearings designed more particularly for use in connection with centrifugal machines, where, by reason of the high speeds at which the parts are driven, a limited lateral motion of the rotary spindle is provided for to enable the same to be self-centering.

The invention consists of an improved construction for this purpose embodying a bearing to receive the radial loads to which the parts are subjected, and a second bearing to receive the thrust loads, said bearings coöperating in their action in such manner that the spindle or shaft is permitted to rock or tip to a limited extent.

In the accompanying drawings I have shown my improved construction of a form and arrangement applicable to that type of centrifugal machines in which the rotary member, such as the basket or bowl, is suspended, but it is to be understood that my invention in its broader aspects is not limited to this particular type of machine but may be employed to advantage for other purposes and in other connections.

The figure of the drawing is a vertical sectional elevation of a bearing embodying my invention.

In the drawing $g$ represents a fixed suspending support in the form of a bolt or stud, and $a$ represents a rotary shaft or spindle suspended from said support by means of a thrust bearing, and radially centered on said support by means of a radial bearing, which two bearings coöperate in such manner that, while the shaft is capable of free rotary motion, it is permitted to rock or shift laterally to a limited extent.

The spindle $a$ is adapted at its lower end to carry as usual a basket or bowl or other part, which is to receive the rotary motion, but which is not shown in the drawings, and at its upper end is connected fixedly with a frame or casing $b$ which, in the present embodiment of my invention, surrounds the suspending stud $g$, and incloses the two bearings by which the shaft is suspended and radially centered. In their detailed construction these bearings may be of any suitable and appropriate form which will act coöperatively for the results to be attained, but I prefer to construct the thrust bearing in the form of a ring $f$, provided with a curved under surface, seated, so as to tip or rock, in a corresponding socket in a washer $f'$ fixed to the lower end of the suspending stud. The ring $f$ is formed in its upper side with a ball groove or track, in which are seated a number of antifriction balls, which give support to a grooved ring $d$ mounted fixedly in the casing. As a result of this construction the casing $b$ and the spindle $a$ connected therewith, are rotatably suspended from the supporting stud $g$ in such manner that the parts may rock or tip laterally with relation to the stud, the diameter of the opening in the ring $f$ being somewhat greater than the diameter of the stud, in order to allow of the lateral play of the ring in its supporting socket.

The bearing for receiving the radial loads is preferably in the form of an inner ring $e$ fixed to the suspending stud, and an outer ring $c$ fixed to the casing $b$, a series of friction balls being interposed between the rings. The inner ring is grooved locally, as usual, to form a circumferential race or track for the balls, but the outer ring is formed with a plain ball surface curved in a longitudinal direction throughout the extent of the ring, and struck from a center coincident with the center of the curve of the surface of the ring $f$, the result being that the outer ring $c$ will shift on the balls as the spindle is rocked and around an axis coincident with the shifting motion of the ring $f$. The curved form of the ball surface of the outer ring $c$ enables this bearing to take the radial loads, notwithstanding any angular deflection which the spindle may assume, and it permits the bearing to coöperate with the thrust bearing in allowing lateral tip or play of the spindle around a center common to both the curves of the rings $c$ and $f$. It is seen, therefore, that while the thrust bearing takes the entire weight or end thrust of the spindle, and while the radial bearing centers the spindle in a radial direction with reference to the suspending stud, the two bearings coöperate while performing these functions in permitting the spindle to shift or rock on a common axis.

The stud $g$ with the ring $f'$ thereon constitutes in effect a support having a curved supporting surface or socket; while the casing $b$ with the vertical ring $c$ and horizontal ring $f$ constitutes in effect a rotary member with a horizontally-disposed curved surface coöperating with the curved supporting surface on the support in taking end thrust loads, and having a vertically-disposed curved surface which coöperates with the support in taking radial loads.

I have illustrated in the drawings and have described in the specification the form of the invention as regards its details which I prefer to adopt, but I desire to be understood that the invention is not limited to any specific form or arrangement of the parts, except in so far as such limitations are specified in the claims.

Having thus described my invention, its construction and mode of operation, what I claim and desire to secure by Letters Patent of the United States is as follows:—

1. In combination with a vertical fixed central suspending stud provided with an annular concave supporting surface, a vertical rotary casing surrounding said suspending stud and having a depending portion adapted to sustain a centrifugal bowl and the like, said casing being supported on the concaved surface of the stud and being rockable thereon laterally relatively to the stud about an axis, and said casing being provided on its interior above the concave supporting surface, with an upright annular bearing surface extending in a curve whose axial center is coincident with the axis on which the casing rocks, said suspending stud coöperating with said upright annular surface in giving radial support to the casing; whereby the free rotation of the casing relatively to the fixed suspending stud will be permitted, and the casing may rock laterally with respect to said stud.

2. In combination with a vertical fixed central suspending stud provided with an annular concave supporting surface, a vertical rotary casing surrounding said suspending stud, a ring surrounding the stud within the casing and provided with a convex surface seated on said concave supporting surface, antifriction rolling elements between said ring and the casing through the medium of which the casing is given end support by the ring, and is permitted to rock laterally relatively to the stud about an axis, the said casing being provided above said ring with an upright annular surface extending in a curve whose axial center is coincident with the axis on which the casing rocks, and a series of antifriction rolling elements between the suspending stud and said upright surface on the casing; whereby radial support is given the casing from the stud, while permitting the casing to rotate freely.

3. In combination with a vertical fixed central suspending stud provided with an annular concave supporting surface, a vertical rotary casing surrounding said stud and provided with an inwardly extending annular shoulder above the concave supporting surface and having on its under side a ball groove, a ring having a convex surface seated on the concave surface and rockable thereon about an axis, said ring being provided in its upper side with a ball groove opposed to that in the shoulder, a series of antifriction balls mounted in said opposing ball grooves and serving to give end support to the casing while permitting the casing to rock relatively to the stud about an axis, the said casing being provided above said ring with an upright surface curved from a center coincident with the axis about which the casing rocks, and the said suspending stud being formed with a ball groove opposed to said upright curved surface, and antifriction balls mounted in said ball groove on the stud and engaged by the upright curved surface on the casing; whereby the two series of antifriction balls give end support and radial support respectively to the casing, while permitting the same to rotate about a vertical axis and also to rock freely relatively to the stud.

In testimony whereof I have affixed my signature in presence of two witnesses.

WERNER AHRENS.

Witnesses:
WOLDEMAR HAUPT,
HENRY HASPER.